United States Patent
Salam et al.

(10) Patent No.: US 10,547,565 B2
(45) Date of Patent: Jan. 28, 2020

(54) AUTOMATIC DETERMINATION AND JUST-IN-TIME ACQUISITION OF DATA FOR SEMANTIC REASONING

(71) Applicant: CISCO TECHNOLOGY, INC., San Jose, CA (US)

(72) Inventors: Samer Salam, Vancouver (CA); Eric A. Voit, Bethesda, MD (US)

(73) Assignee: Cisco Technology, Inc., San Jose, CA (US)

( * ) Notice: Subject to any disclaimer, the term of this patent is extended or adjusted under 35 U.S.C. 154(b) by 946 days.

(21) Appl. No.: 14/677,750

(22) Filed: Apr. 2, 2015

(65) Prior Publication Data

US 2016/0292574 A1     Oct. 6, 2016

(51) Int. Cl.
*H04L 12/911* (2013.01)
*G06N 20/00* (2019.01)

(52) U.S. Cl.
CPC ........... *H04L 47/823* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 8,341,173 B2 | 12/2012 | Li et al. | |
| 8,423,501 B2 | 4/2013 | Wu et al. | |
| 9,628,553 B2 * | 4/2017 | El Defrawy | H04L 41/12 |
| 2008/0222287 A1 * | 9/2008 | Bahl | H04L 41/12 |
| | | | 709/224 |
| 2011/0087629 A1 | 4/2011 | Reza et al. | |
| 2012/0197631 A1 | 8/2012 | Ramani et al. | |
| 2012/0278788 A1 | 11/2012 | Crapo | |
| 2013/0080459 A1 | 3/2013 | Li et al. | |
| 2013/0246315 A1 | 9/2013 | Joshi et al. | |

(Continued)

FOREIGN PATENT DOCUMENTS

CN     103645948 A     3/2014

OTHER PUBLICATIONS

Pescaru, Dan, and Daniel-Ioan Curiac. "Ensemble based traffic light control for city zones using a reduced number of sensors." Transportation Research Part C: Emerging Technologies 46 (2014):261-273.*

(Continued)

*Primary Examiner* — Daniel T Pellett

(57) ABSTRACT

An aspect of the present disclosure aims to reduce problems associated with data acquisition of a rule set. Systems and methods enabling a semantic reasoner to stage acquisition of data objects necessary to bring each of the rules stored in the knowledge base to a conclusion are disclosed. To that end, a dependency chain is constructed, identifying whether and how each rule depends on other rules. Based on the dependency chain, the rules are assigned to difference epochs and reasoning engine is configured to perform machine reasoning over rules of each epoch sequentially. Moreover, when processing rules of each epoch, data objects referenced by the rules assigned to a currently processed epoch are acquired according to a certain order established based on criteria such as e.g. cost of acquisition of data objects. Such an approach provides automatic determination and just-in-time acquisition of data objects required for semantic reasoning.

20 Claims, 8 Drawing Sheets

(56) References Cited

U.S. PATENT DOCUMENTS

| | | |
|---|---|---|
| 2014/0279820 A1 | 9/2014 | MacPherson |
| 2016/0267384 A1 | 9/2016 | Salam et al. |
| 2016/0292581 A1 | 10/2016 | Voit et al. |

OTHER PUBLICATIONS

Dillon, Laura K., and R. E. Kurt Stirewalt. "Lightweight analysis of operational specifications using inference graphs." Proceedings of the 23rd International Conference on Software Engineering. IEEE Computer Society, 2001.*

Soma, Ramakrishna, and Viktor K. Prasanna. "Parallel inferencing for OWL knowledge bases." Parallel Processing, 2008. ICPP'08. 37th International Conference on. IEEE, 2008.*

Brogi, Antonio, Sara Corfini, and Razvan Popescu. "Semantics-based composition-oriented discovery of web services." ACM Transactions on Internet Technology (TOIT)8.4 (2008):19.*

Priya, Sambhawa, et al., "Partitioning OWL Knowledge Bases for Parallel Reasoning," ICSC 2014; 2014 IEEE International Conference on Semantic Computing, Jun. 16-18, 2014, Newport Beach, CA; 8 pages.

U.S. Appl. No. 14/677,768, filed Apr. 2, 2015, entitled "Minimized Processing of Streaming Changes Into a Semantic Reasoner," Inventors: Eric A. Voit, et al.

Attenberg, Josh, et al., "Chapter 1—Selective Data Acquisition for Machine Learning," first published on or about Jun. 8, 2013; 45 pages.

Badea, Liviu, et al., "Semantic Web Reasoning for Ontology-Based Integration of Resources," Proceedings of PPSWR $2^{nd}$ International Workshop, Principals and Practices of Semantic Web Reasoning, St. Malo, France, Sep. 2004; 15 pages.

Barbieri, Davide, et al., "Stream Reasoning: Where We Got So Far," Proceedings of the NeFoRS 2010 Workshop, co-located with ESWC2010, Heraklion, Greece, May 30, 2010; 7 pages.

Della Valle, Emanuel, et al., "It's a Streaming World! Reasoning upon Rapidly Changing Information," The Semantic Web, published in IEEE Intelligent Systems, Nov./Dec. 2009, pp. 83-89.

Gupta, Anoop, et al., "High-Speed Implementations of Rule-Based Systems," ACM Transactions on Computer Systems, vol. 7, No. 2, May 1989, pp. 119-146.

Gupta, Anoop, et al., "Parallel Execution of Prolog Programs: A Survey," ACM Transactions on Programming Languages and Systems, vol. 23, No. 4, Jul. 2001, pp. 472-602.

Heino, Norman, et al., "RDFS Reasoning on Massively Parallel Hardware," Proceedings of the International Semantic Web Conference (ISWC) 2012, Boston, MA, Nov. 11-15, 2012; 16 pages.

Masnadi-Shirazi, Hamed, et al., "Asymmetric Boosting," Proceedings of the $24^{th}$ International Conference on Machine Learning, Corvallis, OR, Jun. 24-24, 2007; 8 pages.

Masnadi-Shirazi, Hamed, et al., "Risk Minimization, Probability Elicitation, and Cost-Sensitive SVMs," Proceedings of the $27^{th}$ International Conference on Machine Learning, Haifa, Israel, Jun. 21-24, 2010; 8 pages.

Masnadi-Shirazi, Hamed, et al., High Detection-rate Cascades for Real-Time Object Detection, Proceedings of the IEEE $11^{th}$ Conference on Computer Vision, Rio de Janiero, Brazil, Oct. 14-20, 2007; 6 pages.

O'Brien, Deirdre, et al., "Cost-Sensitive Multi-class Classification from Probability Estimates," Proceedings of the $25^{th}$ International Conference on Machine Learning, Helsinki, Finland, Jul. 5-9, 2008; 8 pages.

Spanos, Dimitrious-Emmanuel, et al., "SensorStream: A Semantic Real-Time Stream Management System," International Journal of Ad Hoc and Ubiquitous Computing (IJAHUC), vol. 11 No. 2/3, pp. 178-193, Inderscience Enterprises Ltr. Nov. 2012; 18 pages.

EPO 2017-1-5 Search Report and Opinion from European Application Serial No. 16154563.

Soma, Ramakrisna, et al., "Parallel Inferencing for OWL Knowledge Bases," $37^{th}$ International Conference on Parallel Processing 2008, ICCP '08, Piscataway, NJ, Sep. 9, 2008; 8 pages.

Margara, Alessandro, et al., "Streaming the Web: Reasoning over dynamic data," Web Semantics: Science, Services and Agents on the World Wide Web, vol. 25, Mar. 1, 2014, 21 pages.

Bernhard Nebel, et al., "Ignoring Irrelevant Facts and Operators in Plan Generation", In: Steel S., Alami R. (eds) Recent Advances in AI Planning. ECP 1997. Lecture Notes in Computer Science (Lecture Notes in Artificial Intelligence), vol. 1348. Springer, Berlin, Heidelberg, Jul. 29, 2005, 13 pages.

Wikipedia, "Configuration management database", https://web.archive.org/web/20150313153219/http://en.wikipedia.org/wiki/Configuration_management_database, Mar. 13, 2015, 4 pages.

A. Clemm, et al., "Mounting YANG-Defined Information from Remote Datastores", draft-clemm-netmod-mount-01.txt, Network Working Group, Internet-Draft, Sep. 22, 2013, 29 pages.

Zheng Wang, et al., "Partitioning Streaming Parallelism for Multicores: A Machine Learning Based Approach", PACT'10, Sep. 11-15, 2010, Vienna, Austria, 12 pages.

Han Hu, et al., "Toward Scalable Systems for Big Data Analytics: A Technology Tutorial", Jun. 24, 2014, Digital Object Identifier 10.1109/ACCESS.2014.2332453, vol. 2, 36 pages.

Davide Francesco Barbieri, et al., "Incremental Reasoning on Streams and Rich Background Knowledge", Ersch. in: The semantic web: research and applications: 7th Extended Semantic Web Conference, ESWC 2010, Heraklion, Crete, Greece, May 30-Jun. 3, 2010, Proceedings, Part I / Lora Aroyo . . . (eds.).—Berlin [u.a.] :Springer, 2010.—S. 1-15.—(Lecture notes in computer science ; 6088).—ISBN 978-3-642-13485-2, Konstanzer Online-Publikations-System (KOPS), 15 pages.

English Translation of the First Office Action in counterpart Chinese Application No. 201610141086.9, dated Jan. 22, 2018, 14 pages.

English Translation of the Second Office Action in counterpart Chinese Application No. 201610141086.9, dated Sep. 25, 2018, 14 pages.

Wikipedia page, "Rete algorithm", https://en.wikipedia.org/wiki/Rete_algorithm, last edited Mar. 30, 2019, 10 pages.

Desai et al., "Red Hat JBoss BRMS 6.0 Development Guide", last updated Nov. 17, 2017, 159 pages.

Blog, "Drools & jBPM: Protege 3.5 Alpha released with Drools SWRLTab support", http://blog.athico.com/2012/03/protege-35-alpha-released-with-drools.html, Mar. 24, 2012, 8 pages.

Blog, "Drools & jBPM: R.I.P. RETE time to get PHREAKY", http://blog.athico.com/2013/11/rip-rete-time-to-get-phreaky.html, Nov. 1, 2013, 8 pages.

Blog, "Learn OWL and RDFS", https://www.cambridgesemantics.com/blog/semantic-university/learn-owl-rdfs/rdfs-vs-owl/, May 16, 2012, 6 pages.

"RDF Streams Models", RDF Stream Processing Community Group, https://www.w3.org/community/rsp/wiki/RDF_Stream_Models, last modified Sep. 19, 2014, 5 pages.

Stream Reasoning, http://web.archive.org/web/20150311155501/http://streamreasoning.org/, Mar. 11, 2015, 2 pages.

European Examination Report in European Application No. 16154563.7, dated Mar. 6, 2018, 9 pages.

Horrocks, Ian, et al. "SWRL: A semantic web rule language combining OWL and RuleML," W3C Member submission21.79 (2004): 1-31. (Year:2004).

English translation of the Third Office Action in Chinese Application No. 201610141086.9, dated May 10, 2019, 11 pages.

* cited by examiner

AUTOMATIC DETERMINATION AND JUST-IN-TIME ACQUISITION OF DATA FOR SEMANTIC REASONING

TECHNICAL FIELD

This disclosure relates in general to the field of communications and, more particularly, to data control and management using semantic reasoners.

BACKGROUND

Data centers are increasingly used by enterprises for effective collaboration and interaction and to store data and resources. A typical data center network contains myriad network elements, including hosts, load balancers, routers, switches, etc. The network connecting the network elements provides secure user access to data center services and an infrastructure for deployment, interconnection, and aggregation of shared resources as required, including applications, hosts, appliances, and storage. Improving operational efficiency and optimizing utilization of resources in such data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
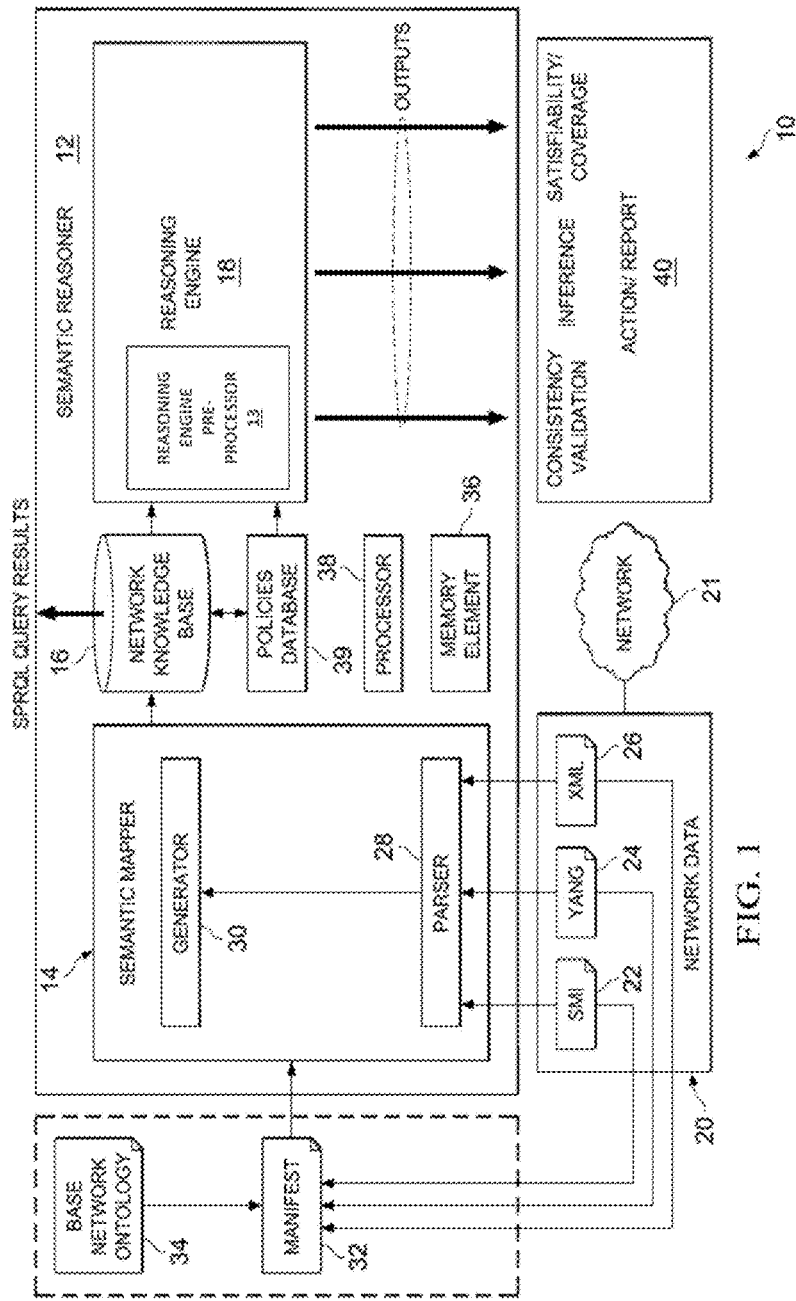
FIG. 1 is a simplified block diagram illustrating a communication system for facilitating data control and management using semantic reasoners in a network environment, according to some embodiments of the present disclosure.

One aspect of the present disclosure provides an example computer-implemented method executed by a semantic reasoner in a system, e.g. a semantic reasoner in a network. Since the method enables sequential data acquisition of data objects and processing of rules, such a method is referred to herein as a "sequential data acquisition method." The sequential data acquisition method includes steps of constructing a dependency chain for a plurality of rules stored in a knowledge base (KB), the dependency chain identifying whether and how each rule of the plurality of rules depends on other rules of the plurality of rules and, based on the dependency chain, assigning each rule of the plurality of rules to one epoch of a sequence of N epochs $E_1$-$E_N$ (N being an integer equal to or greater than 2), and performing machine reasoning over each of the N epochs sequentially (i.e., performing machine reasoning over the sequence of N epochs by processing one epoch at a time in the order of the sequence), where performing machine reasoning over each epoch includes using one or more criteria to establish an order for acquiring one or more data objects referenced by one or more rules assigned to the epoch and acquiring the one or more data objects in the established order.

In an embodiment, the rules are assigned to epochs so that each rule of one or more rules assigned to a first epoch $E_1$ of the sequence does not depend on any other rules of the plurality of rules and so that each rule of one or more rules assigned to an epoch subsequent to the first epoch $E_1$ (i.e., any epoch besides the first epoch) depends on at least one rule of an epoch immediately preceding the epoch in the sequence of N epochs.

In an embodiment, performing machine reasoning over each current epoch $E_i$ (i being an integer equal to or greater than 1 and equal to or smaller than N) may include steps of (a) identifying one or more data objects referenced by all rules of the one or more rules of the current epoch $E_i$ that have not reached a conclusion, (b) using one or more criteria to establish an order for acquiring the one or more data objects identified in step (a), where establishing the order comprises assigning each data object of the one or more data objects identified in step (a) to one group of an ordered set of one or more groups, (c) acquiring one or more data objects assigned to a group that is first in the ordered set of the one or more groups, and (d) using a reasoning engine to perform machine reasoning over the one or more data objects acquired in step (c) over the one or more rules of the current epoch $E_i$. In one further embodiment, performing machine reasoning over each epoch $E_i$ may further include (e) following the machine reasoning of step (d), identifying which zero or more rules of the one or more rules of the current epoch $E_i$ have not reached a conclusion, and (f) iterating steps (a)-(e) until all rules of the one or more rules of the current epoch $E_i$ have reached a conclusion.

In an embodiment, step (b) may include identifying one or more atoms comprised within the one or more rules assigned to the epoch $E_i$, the one or more atoms referencing the plurality of data objects and determining, for each atom of the one or more atoms, a data source for acquiring one or more data objects referenced by the atom.

In an embodiment, determining the data source for each atom may include determining an XPath of YANG object that maps to the atom, e.g. by determining the XPath of YANG object based on one or more YANG models of one or more network elements referenced by the plurality of rules, base ontology of a knowledge base comprising the plurality of rules, and a set of predefined mapping rules.

In an embodiment, constructing the dependency chain may include determining, for each rule of the plurality of rules, whether the rule depends on one or more other rules of the plurality of rules. A first rule of the plurality of rules may be determined to depend on a second rule of the plurality of rules when execution of the first rule depends on execution of the second rule.

In an embodiment, the one or more criteria applied in establishing the order for the data object acquisition may include one or more of a location of a data object in a memory, the data object having been acquired in one or more preceding epochs of the sequence, and an estimated cost of acquiring the data object.

In an embodiment, step (d) described above may include steps of generating a semantic model of the system from the data objects acquired in step (c) according to a base ontology of the system, automatically mapping the semantic model to a knowledge base, feeding contents of the knowledge base to the reasoning engine, and using the reasoning engine to perform machine reasoning over the contents fed to the reasoning engine. In one further embodiment of such an embodiment, the step of generating the semantic model of the system may include parsing the one or more data objects acquired in step (c), loading the parsed one or more data objects into in-memory data structures, accessing a manifest specifying binding between a data definition format and ontology components of the base ontology, identifying ontology components associated with the one or more data objects acquired in step (c) based on the manifest, and populating the identified ontology components with individuals and properties from the corresponding in-memory data structures. The data definition format comprises a selection from a group consisting of Structure of Management Information (SMI), YANG, and Extensible Markup Language (XML).

In an embodiment, step (d) may include using the reasoning engine to perform machine reasoning according to pre-configured rules and policies.

In an embodiment, step (d) may include using the reasoning engine to perform machine reasoning according to a Rete algorithm.

Another aspect of the present disclosure provides another example of a computer-implemented method executed by a semantic reasoner. Since this method minimizes processing of streaming changes into a semantic reasoner, such a method is referred to herein as a "minimized processing method." The minimized processing method includes steps of constructing a dependency chain for a plurality of rules stored in a knowledge base (KB), the dependency chain identifying whether and how each rule depends on other rules, and, following machine reasoning over a first set of data objects (i.e., current state of inputs represented within the KB) over at least some rules, identifying a set of changed data objects as one or more data objects of a second set of data objects that include one or more changes with respect to (i.e., compared to) the first set of data objects. The minimized processing method further includes steps of using the dependency chain, identifying one or more rules of the plurality of rules that are affected, directly or indirectly, by at least one data object of the set of changed objects, and using a reasoning engine to perform machine reasoning by re-processing the identified one or more rules.

In an embodiment, the step of using the dependency chain to identify the one or more rules may include identifying a first set of rules comprising one or more rules having as an input at least one data object of the set of changed data objects, and, based on the dependency chain, for each rule that is not identified in the first set of rules, determining whether an input of the rule depends, either directly or indirectly, on an output of at least one rule of the first set of rules. Upon positive determination, the minimized processing method includes a step of adding such a rule to a second set of rules, where the second set of rules also includes the one or more rules of the first set of rules. In one further embodiment, the step of using the reasoning engine to perform machine reasoning may include using a reasoning engine to perform machine reasoning by re-processing only one or more rules of the second set of rules only with respect to an input that either comprises the at least one data object of the set of changed data objects or depends, either directly or indirectly, on the output of at least one rule of the first set of rules.

In an embodiment, the minimized processing method may further include a step of generating an output of machine reasoning over the second set of data objects by combining an output of the re-processing with at least a part of an output of the machine reasoning over the first set of data objects. Thus, in order to obtain an output of machine reasoning over the second set of data, it is no longer necessary to re-process the entire second set of data. Instead, only the rules that are affected by the changes compared to the previous round of machine reasoning are re-processed and the output of this re-processing is then combined with the output of the processing in the previous round with respect to the remaining rules.

In an aspect of the minimized processing method, rules may be re-processed by epochs as described above for the sequential data acquisition method. Re-processing of rules of one epoch may reduce the number of rules which need to be re-processed in the subsequent epochs, thus further minimizing re-processing. All other embodiments and features of the sequential data acquisition method described herein are applicable to embodiments of the minimized processing method, with modifications which would be apparent to a skilled person reflecting that data acquisition is performed not with respect to the entire rule set in the KB but only with respect to those rules affected by the changes (e.g. the second rule set).

In an embodiment of the minimized processing method, each rule of the second set rules could be a rule for which, as a direct or indirect consequence of the set of changed data objects, at least one individual referencable (i.e. that could be, but not necessarily is, referenced) by the rule has been modified, added, or removed, at least one individual referenced by the rule has been added or removed from zero or more classes included in the rule, or at least one property of at least one individual referenced by the rule has been changed.

In an embodiment of the minimized processing method, plurality of interconnected rules bases may provide a dynamic feedback loop across devices. In such an embodiment, a set of interconnected network elements may stream at least some incremental changes to and from each other, e.g. as part of the second set of data objects, based on separate rule base processing in each system.

Since embodiments of the various method described herein involve manipulation data processed by a reasoning engine, a functional entity within a device, such as e.g. a network element, performing embodiments of the method described herein will be referred to in the following as a "reasoning engine pre-processor." As will be appreciated by one skilled in the art, aspects of the present disclosure, in particular the functionality of the reasoning engine pre-processor described herein, may be embodied as a system, a method or a computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor, e.g. a microprocessor, of a computer. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing network elements such as the existing routers, switches, various control nodes, etc.) or be stored upon manufacturing of these devices and systems.

Example Embodiments

Turning to FIG. 1, FIG. 1 is a simplified block diagram illustrating a communication system 10 for facilitating data control and management using semantic reasoners in a network environment in accordance with one example embodiment. While embodiments described herein are explained with reference to the system being a network and with reference to network data, base network ontology, network knowledge base, etc., the functionality described herein, in particular the functionality of a reasoning engine pre-processor, can be implemented to process any type of data, not necessarily network data, and is applicable to any environments and systems, not necessarily a network environment and a network. For example, embodiments described herein may be implemented with respect to machine reasoning over sensor data (e.g. sensor clouds of Semantic Sensor Networks, SSNs) or over web data (e.g. social network feeds).

FIG. 1 illustrates a communication system 10 comprising a semantic reasoner 12 comprising a semantic mapper 14, a knowledge base (KB) 16, e.g. a network KB, and a reasoning engine 18. Data 20, e.g. network data, from a system 21, e.g. network 21, may be fed into the semantic reasoner 12 in any suitable data format, for example (without limitation), Structure of Management Information (SMI) 22, YANG 24, or Extensible Markup Language (XML) 26. According to various embodiments, a parser sub-module 28 and a generator sub-module 30 in the semantic mapper 14 may cooperate with a reasoning engine pre-processor 13 to dynamically and automatically populate the KB 16 with data extracted from the network data 20 e.g. using a manifest 32 according to a base ontology 34, e.g. base network ontology 34. A memory element 36 and a processor 38 may facilitate the various operations performed by any elements of the semantic reasoner 12, in particular the operations performed by the reasoning engine pre-processor 13. The reasoning engine 18 may perform machine reasoning on content in the KB 16 according to a semantic model, for example, using policies and rules from a policies database 39, and generate action(s) or report(s) 40 appropriate for controlling and managing the network 21. Note that the action/report 40 may include any suitable action or report, including remedial action and reports, notification actions and informational reports.

In a general sense, an ontology formally represents knowledge as a hierarchy of concepts within a domain (e.g., a network), using a shared vocabulary to denote types, properties and interrelationships of the concepts. In particular, a "base network ontology" (e.g., 34) of a network (e.g., 21) may comprise an explicit representation of a shared conceptualization of the network, providing a formal structural framework for organizing knowledge related to the network as a hierarchy of inter-related concepts. The shared conceptualizations may include conceptual frameworks for modeling domain knowledge (e.g., knowledge related to the network, content specific protocols for communication among devices and applications within the network, etc.) and agreements about representation of particular domain theories. In a general sense, the base network ontology 34 may be encoded in any suitable knowledge representation language, such as Web Ontology Language (OWL). In an embodiment, contents of the KB 16 may include Web Ontology Language Description Logics (OWL-DL) ontology files.

As used herein, the term "manifest" refers to a list of bindings (e.g., mappings) between a data definition format (e.g., SMI version 2 (SMIv2), YANG, XML, etc.) and ontology components. In some embodiments, the manifest 32 may be relatively static in nature, and may be developed based on the associated base network ontology 34 and SMI/YANG/XML, etc. of the network data 20 being mapped. As the base network ontology 34 evolves (e.g., is updated), the manifest 32 may be updated accordingly (e.g., by a human operator).

As used herein, a "semantic model" (or "semantics model") comprises a conceptual data model (e.g., description of objects represented by computer readable data including a map of concepts and their relationships) in which semantic information is included. The semantics model describes the meaning of its instances, thereby allowing, without human intervention, expression of meaning in any information exchange based on the model. In particular, the semantics model of a system, such as e.g. the system 21, includes a knowledge representation of the system consisting of a framework of semantically related terms. The knowledge representation may include, for example, a directed or undirected graph consisting of vertices (which represent concepts, such as various network elements) and edges (which represent the relations between the concepts).

As used herein, the terms "semantic reasoner" and "reasoning engine" refer to software and/or hardware (e.g., application specific integrated circuits, field programmable gate arrays, etc.) able to infer logical consequences from a set of asserted facts and/or axioms.

For purposes of illustrating the techniques of the communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

In today's complex Information Technology (IT) environments, operation involves managing and reasoning over large volumes of data that span at least the following broad categories: (1) business rules that dictate overall system behavior and outcomes; (2) policy definitions that govern connectivity patterns and control-plane operation; (3) device configurations that are subject to software and/or hardware capabilities and limitations; and (4) operational soft-state data including e.g. routing tables, statistics, etc. that can be used for Big Data analytics. Whereas multiple network management and operations, administration and management (OAM) tools exist, network operation continues to be a high-touch task that requires human involvement to interpret the data or configure policies based on technical or business contexts.

Software defined networking (SDN) promises to reduce human involvement by having applications declare their intent programmatically to controllers, and the latter drive the operation of the network. Integral to the success of SDN is network management and control logic with the ability to reason (i.e., perform machine reasoning) over various network data categories. Such reasoning involves detecting policy violations; reconciling between conflicting policy definitions; detecting unintended consequences and reverting to stable state; and inferring network configuration based on intent and contextual information, among other features. The reasoning can be mechanized using semantic technologies, including ontology languages (e.g., Web Ontology Language (OWL), OWL-Descriptions Logics (OWL-DL), resource description framework (RDF), Semantic Web Rule Language (SWRL), etc.); ontology editors (e.g., Protege); semantic frameworks (e.g., Sesame); and semantic reasoners (e.g., Pellet, HermiT, FaCT++, etc.).

Challenges Associated with Data Acquisition over a Rule Set

One of the challenges in systems described above is the cost associated with acquiring, at scale, data objects over which machine reasoning is to be performed, in terms of the burden that constant pulling or polling has on the network elements' processors and in terms of storage requirements on an entity hosting a semantic reasoner (which could be a server, a controller or any network element). As such, it is highly desirable to defer fetching of "expensive to acquire" data until the point of time when getting that data is the least cost barrier to completing a step of reasoning. Such an approach may be referred to as "just-in-time acquisition."

Another challenge is that, in the current state of the art, a user is required to manually enter into the knowledge base a set of one or more rules that identify the command(s) that should be issued to the network elements in order to collect the required configuration and operational data. Such an approach has multiple shortcomings. One is that it requires human effort to correlate the required data for the normative rules with the associated set of device commands needed in order to collect the data. Consequently, users must understand an extra and significant layer of Application Programming Interface (API), including the costs of invoking different parts of that API. Most users would prefer to be oblivious to such knowledge. Another shortcoming is that such an approach forces target system specific rules, as the commands/APIs available to get information may vary. Yet another shortcoming of such an approach is artificially increased total number of rules in the KB due to forcing the integration of target system "get" commands. This potentially increases the inference time and slows down the performance of the reasoning engine. This is especially true since rules that define the commands share little pattern matches with normative rules, and, hence, any advantage of pre-caching that could be realized by an optimized inference algorithm such as Rete algorithm is atypical. As a result, as the amount of rules and data needed to be processed keeps increasing, the human effort required to construct the rules that define the commands will be significant.

Rete algorithm may be considered as one current approach that aims to minimize the issues described above. The Rete algorithm is an optimized rule evaluation algorithm that decouples the evaluation of hypothesis from rule execution sequencing. The algorithm is typically used as the rules processing engine in semantic reasoners and works by constructing a network of nodes that each holds a list of objects, which satisfy the associated condition of a rule. A discrimination tree is the first part of a Rete network. The discrimination tree starts with Alpha nodes that are associated with Classes (in the object-oriented sense). All instances of a given class will be listed in any given Alpha node. The discrimination happens by adding conditions as single nodes attached to a Alpha node. In the second part of the Rete network, the nodes are connected across classes. This is where conditions are combined (i.e. logical conjunctions). Nodes that combine conditions are called "join" or Beta nodes. Beta nodes combine the list of objects that verify conditions on one branch with the list of objects that verify the conditions on another branch. Thus, a Beta node serves as a merge point for two upstream nodes.

While the Rete algorithm may be highly optimized in terms of inference processing, it does not incorporate the cost of data acquisition into its processing logic.

Another current approach, referred to as Peer Mount, is a technology that offers client applications a service for network element data acquisition by providing an interface where applications can request read/write operations on YANG XPath associated with a given target device, with the Peer Mount infrastructure handling data acquisition from target devices over the network. While this technology provides data acquisition services with a level of abstraction, it does not factor into account the acquisition cost.

Challenges Associated with Large Sets of Data

Further complicating the problems described above, another challenge in current semantic reasoning systems is that large rule bases require large processing resources and are time consuming to process. In addition, network state changes quickly, making the approach of running a full analysis each time network data changes at best inefficient, and more likely impossible.

Improved Semantic Reasoning

According to various embodiments described herein, systems and methods configured to address, among others, the various issues described above.

An aspect of the present disclosure that aims to reduce or eliminate the problems associated with data acquisition of a rule set offers a system and method enabling a semantic reasoner to stage acquisition of data objects necessary to bring each of the rules stored in the knowledge base to a conclusion. To that end, a dependency chain is constructed, identifying whether and how each rule depends on other rules. Based on the dependency chain, the rules are assigned to difference epochs and reasoning engine 18 is configured to perform machine reasoning over rules of each epoch sequentially. Moreover, when processing rules of each epoch, data objects referenced by the rules assigned to a currently processed epoch are acquired according to a certain order established based on criteria such as e.g. cost of acquisition of data objects. Such an approach provides automatic determination and just-in-time acquisition of data objects required for semantic reasoning.

An aspect of the present disclosure that aims to reduce or eliminate the problems associated with processing quickly changing large sets of data offers a system and method enabling a semantic reasoner to identify and process incremental changes to a rules base rather than re-processing the entire rules base. Such incremental stream reasoning (i.e., only reasoning upon pushed object changes) provides an efficient and fast manner for reacting to quickly changing data.

In various embodiments, the systems and methods of these two aspects of the present disclosure may be combined, in order to further improve functionality of the semantic reasoner 12 described herein.

Basics of Rule Processing

Various methods described herein are based on special groupings of rules, therefore, first, a general description of rules is provided.

Within today's networking domain, a preferred embodiment of a semantic reasoner operation is expected to be via Semantic Web Rules Language (SWRL) rule evaluation. In one embodiment of the present disclosure, rules described herein may comprise SWRL rules.

SWRL rules have the general form comprising a "Body" and a "Head" and are expressed as "Body->Head." Each of the Body and the Head comprise one or more atoms, where an atom can be either a Class atom or a Property atom, an atom comprising a subject of the atom that references one or more Individuals (i.e. the Individuals may be viewed as subjects of the rules). A Class atom tests or asserts that an Individual is a member of a particular Class. For example, a Class atom "Interface(?x)" may test or assert that an Individual "x" is a member of a Class "Interface" (i.e., that "x" is an interface). A Property atom tests or asserts that an Individual is associated with a given property (i.e. relationship). For example, a Property atom "hasIPv4Address(?x, ?y)" may test or assert that Individual "x" has as its IPv4 address the Individual "y".

When Body of a rule evaluates to TRUE, the rule fires and the statement(s) in the Head is (are) asserted over the KB (over the KB Individuals). For example, a rule to detect IP address collision between two interfaces denoted as "x1" and "x2" may be expressed in SWRL as follows:

hasSameAddressAs(?x1, ?x2), hasSameVFIAs(?x1, ?x2), DifferentFrom (?x1, ?x2)->hasDuplicateAddress(?x1, ?x2)

where "hasSameAddressAs" and "hasSameVFIAs" are Property atoms of the Body of the rule, "DifferentFrom" is a SWRL built-in function, "hasDuplicateAddress" is a Property atom of the Head of the rule, and "x1" and "x2" are KB Individuals (i.e., subjects of the rule). The Body of such a rule is evaluated to TRUE when it is determined that interfaces x1 and x2 have the same address (hasSameAddressAs(?x1, ?x2)), have the same virtual forwarding instance (VFI) (hasSameVFIAs(?x1, ?x2)), and are different from one another (DifferentFrom (?x1, ?x2)). When the Body evaluates to TRUE, such a rule will assert that interface x1 has a duplicate address of interface x2 (hasDuplicateAddress(?x1, ?x2)), as provided in the Head of this rule.

In another example of how the rules are used, an existing semantic approach for policy based networking uses border gateway protocol (BGP) with semantic information (e.g., associated with routes) expressed in an Ontology Web Language (OWL). Policies are expressed using SWRL to provide fine-grained control where the routers can reason over their routes and determine how the routes are to be changed. SWRL rules together with OWL express a BGP ontology defining the routing policy and semantic reasoners may act over the ontology and the rules to generate the router's BGP configuration (e.g. route import/export rules).

As used herein, an "Individual" (e.g. a "KB Individual") refers to an instance of an OWL Class defined in the ontology that specifies the semantic model of the Knowledge Base in question.

Further as used herein, describing that a rule has reached a conclusion refers to a reasoning engine inferring, as a result of the machine reasoning performed by the engine, zero or more logical consequences for the rule based on a set of acquired data objects referenced by the rule. Thus, a "Conclusion" of a rule refers to the outcome of the semantic machine reasoning performed on the rule. For the example of the rule to detect IP address collision between interfaces x1 and x2 described above, the rule may be said to have reached the conclusion when the reasoning engine inferred that interface x1 has (or does not have) a duplicate address of interface x2. In general, a rule reaches a conclusion when Body of a rule has been evaluated, thus not only when Body of a rule evaluates to TRUE, the rule fires and the statement(s) in the Head is (are) asserted over the KB (over the KB Individuals) but also when the Body of a rule evaluates to FALSE.

While examples provided herein refer to SWRL rules, teachings provided in the present disclosure are equally applicable to any rule language that uses Horn clauses.

Improvements Associated with Data Acquisition over a Rule Set

In one embodiment, the reasoning engine pre-processor 13 is configured to carry out the sequential data acquisition method enabling the semantic reasoner 12 to stage acquisition of data objects necessary for the reasoning engine 18 to perform machine reasoning for bringing each of the rules stored in the knowledge base 16 to a conclusion.

In such an embodiment, the KB 16 may include an OWL Class that defines the concept of a network element. All normative rules that operate on network data 20 include a Class atom that references OWL Individuals of said "Device" Class. In order to bootstrap the reasoning engine 18, Individuals of this Class are first instantiated, either manually or programmatically. This provides the input to the reasoning engine 18 as to which network elements the engine may need to analyze. In one embodiment, instantiation of the Individuals may be as simple as providing the IP address of the console or management interface(s) associated with the device(s) as the name or property of those Individuals.

The reasoning engine pre-processor 13 configured to carry out the sequential data acquisition method described herein is responsible for determining which configuration or operational data needs to be acquired from the network 21 (and if so, then from which network elements) and for determining the sequencing and prerequisites which are to be met before any data object is requested from its source. To that end, the reasoning engine pre-processor 13 is configured to have access to the normative rules of the KB 16 and the Individuals representing the total set of network elements to be operated on (as described above).

Figure 2A:
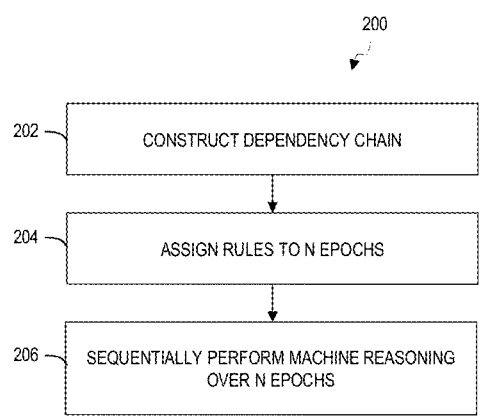
FIGS. 2A-2B are simplified flow diagrams illustrating example operations of a sequential data acquisition method, according to some embodiments of the present disclosure.
Figure 2B:
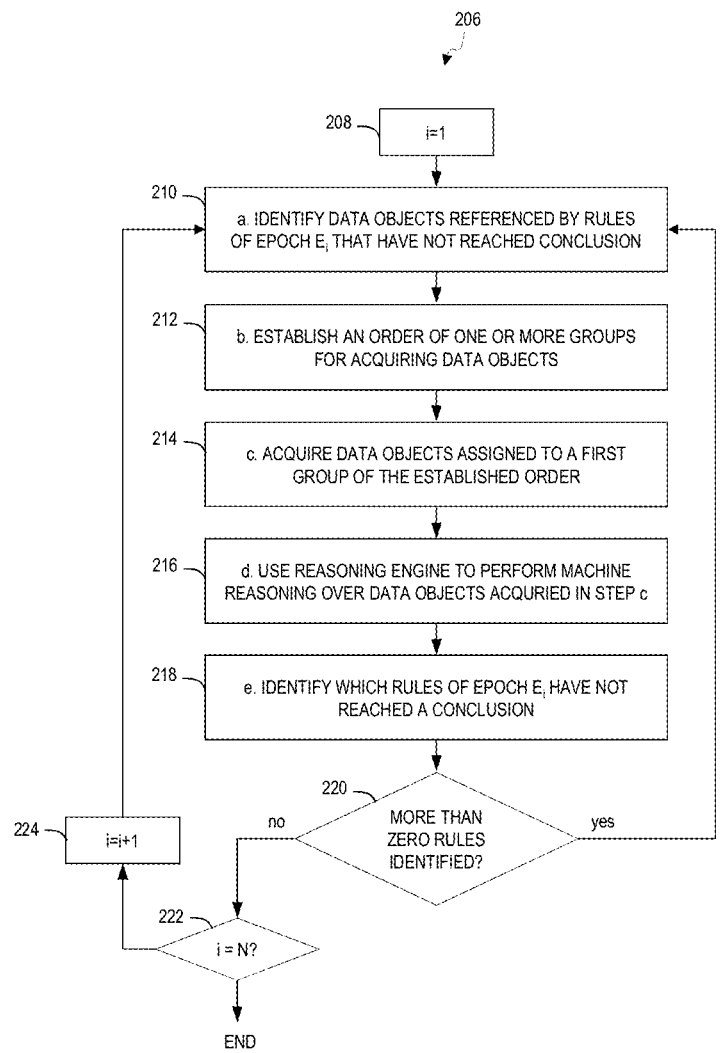

FIGS. 2A-2B are simplified flow diagrams illustrating example operations that may be associated with embodiments of the communication system 10. The operations shown in FIGS. 2A-2B outline a computer-implemented sequential data acquisition method 200 carried out by the reasoning engine pre-processor 13. While method steps of the method 200 are explained with reference to the elements of the communication system 10 of FIG. 1, a person skilled in the art will recognize that any system or network element configured to perform these method steps, in any order, is within the scope of the present disclosure.

As shown in FIG. 2A, the method 200 may begin in step 202, where the reasoning engine pre-processor 13 constructs a dependency chain for the plurality of rules in the KB 16. The dependency chain identifies whether and how each rule depends on other rules in the KB 16.

Rule A may be described as "dependent" on rule B if execution of rule A depends on the execution of rule B. For example, rule A may be dependent on rule B if Conclusion of rule B impacts the input and/or the arguments of rule A. In another example, when each of the rules A and N are considered to comprise a Body and Head, each of the Body and the Head comprising one or more atoms (Class and/or Property atoms), subjects of each atom referencing one or more Individuals, rule A may be identified as being dependent on rule B when at least one Class atom comprised in a Head of rule B of the pair of rules is comprised in a Body of rule A. In a further example, rule A may be identified as being dependent on rule B when at least one Property atom comprised in a Head of rule B is a Property atom in a Body of rule A and a subject of the Property atom comprised in the Head of rule B references at least one individual that is also referenced by a subject of the Property atom in the Body of rule A. In yet another example, rule A may be identified as being dependent on rule B when a subject of at least one Class atom comprised in a Head of rule B references at least one Individual that is also referenced by a subject of at least one Property atom comprised in a Body of rule A. In an embodiment, conditions of such examples may include inheritance intersections based on Classes or Properties (since OWL supports Class and Property hierarchies).

Figure 3:
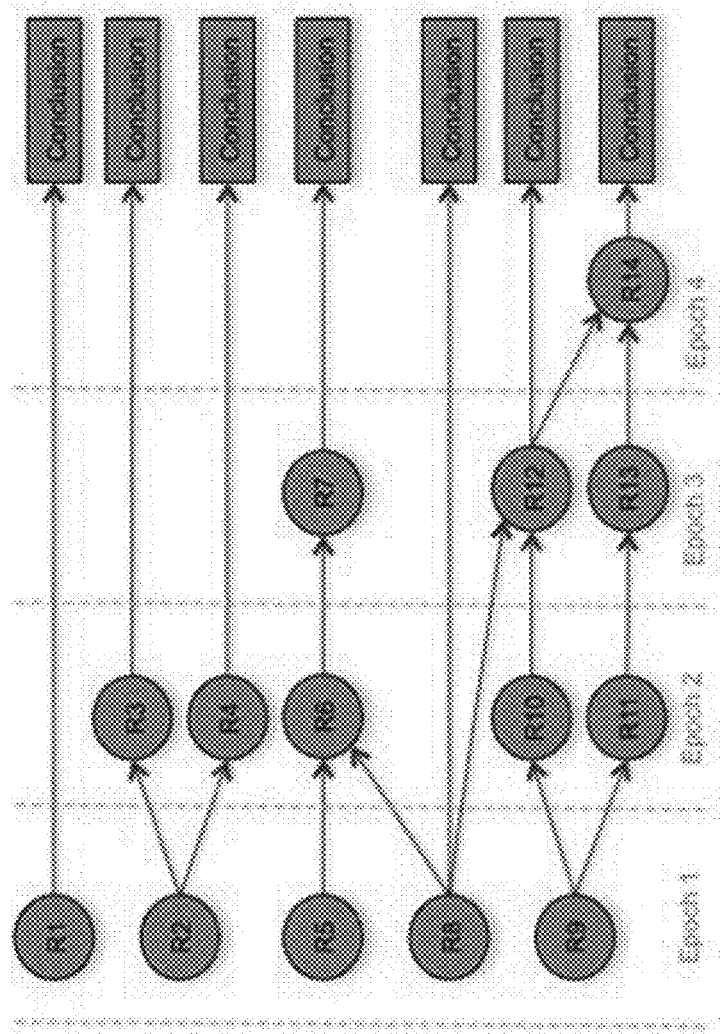
FIG. 3 is a simplified block diagram illustrating example dependencies between the rules and assignment of rules to a sequence of epochs, according to some embodiments of the present disclosure.

Constructing a dependency chain enables classification of rules into "epochs" of a sequence of N epochs $E_1$-$E_N$ (N being an integer greater than 1). Rules that do not depend on any other rules in the KB are assigned to the first epoch $E_1$. Rules assigned to each subsequent epoch $E_i$ (index "i" in this case being greater than 1) are those that depend on the outcome of at least one rule in epoch $E_{i-1}$ (i.e., the epoch immediately preceding the epoch $E_i$ in the sequence of epochs) and, possibly, on zero or more rules in epochs preceding the epoch $E_{i-1}$. FIG. 3 is a simplified block diagram illustrating example dependencies between the rules and assignment of rules to a sequence of epochs, according to an embodiment of the present disclosure. In FIG. 3, rule A is illustrated to depend on rule B with an arrow going from rule B to rule A. As illustrated in FIG. 3, rules R1, R2, R5, R8, and R9 do not depend on any other rules and, therefore, are assigned to the first epoch (Epoch 1). Each of the rules R3, R4, R6, R10, and R11 depends on at least one (but possibly more) of the rules assigned to the first epoch and, therefore, are assigned to the second epoch (Epoch 2). Similarly, each of the rules R7, R12, and R13 depends on at least one (but possibly more) of the rules assigned to the second epoch and, therefore, are assigned to the third epoch (Epoch 3). As illustrated in the example of FIG. 3, rule R12 also depends on a rule of the first epoch (R8), but rule R12 is still assigned to the third epoch because it also depends on a rule of the immediately preceding epoch—R10 of Epoch 2. The last, fourth, epoch shown in FIG. 3 contains only one rule, R14, which depends on two rules of the third epoch. Of course, in various embodiments, a sequence of epochs may contain any number of two or more epochs containing any kinds of dependencies between the rules.

Once rules have been classified into epochs, the method 200 may proceed to step 206, where the reasoning engine pre-processor 13 may instruct/control the reasoning engine to perform machine reasoning over the N epochs sequentially. Thus, first all of the rules assigned to the first epoch are processed to the point that all of the rules of the first epoch have reached a conclusion, then all of the rules assigned to the second epoch are processed to the point that all of the rules of the second epoch have reached a conclusion, and so on.

One implementation of such sequential processing of rules of the epochs is shown in FIG. 2B. Index "i" in FIG. 2B represents an index of a current epoch (i.e., the epoch being processed). As shown in FIG. 2B, the sequential machine reasoning of step 206 may begin in step 208 where the reasoning engine pre-processor 13 may set index "i" to 1 so that the rules of the first epoch ($E_1$) may be processed. The method then proceeds to step 210 (step a) where the reasoning engine pre-processor 13 identifies one or more data objects referenced by all rules of the current epoch (in the first iteration, epoch $E_1$) that have not yet reached a conclusion. With reference to the example of FIG. 3, this means that in step 210 the reasoning engine pre-processor 13 determines which of the rules R1, R2, R5, R8, and R9 of the first epoch have not yet reached a conclusion and, for those rules, identifies which data objects the rules reference.

The method then proceeds to step 212 (step b) where the reasoning engine pre-processor 13 applies one or more criteria to those data objects of the ones identified in step 210 that have not yet been acquired to establish an order for acquiring these data objects. In general, an order may be established by assigning each data object of the data objects identified in step 210 that have not yet been acquired to one group of an ordered set of one or more groups. In some embodiments, each group may comprise only one data object, in which case establishing the order simply involves putting the data objects identified in step 210 that have not yet been acquired in a line where, first, data object that is first in the line is fetched, then the next data object in the line is fetched, and so on. In some embodiments, at least some (or all) of the groups may include several data objects, which data objects may then be fetched simultaneously, in a time-overlapping manner, or sequentially (if e.g. a further order is established for the multiple data objects within a group).

As described above, the set of groups is an ordered set, with the order being such that data objects of the first group of the set is acquired first. Typically in the beginning of processing of an epoch, there are many data objects that need to be acquired and the data objects would be assigned to a number of groups, e.g. 5 groups, where the data objects of the first group are acquired first. As following description will illustrate, if nothing else changes, then, in the next iteration, the data objects that were assigned to the second group in the first iteration become data objects assigned to the first group (because the data objects that were assigned to the first group in the first iteration have already been acquired), and so on.

In various embodiments, the reasoning engine pre-processor 13 may apply various criteria in establishing the grouping order for acquiring the data objects that have not yet been acquired. For example, one or more criteria for establishing the grouping order for acquiring the plurality of data objects may depend on a location of a data object in a memory (e.g. data object stored locally vs data object stored in a remote memory, or data object stored in a cache memory or even already in a register vs data object stored in a main memory). In another example, the one or more criteria may depend on whether a data object has been acquired in one or more preceding epochs of the sequence or previous KB evaluations, provided that the copy of the data object acquired in the preceding epoch(s) is still valid. In yet another example, the one or more criteria may depend on an estimated cost of acquiring a data object (either calculated automatically by the reasoning engine pre-processor 13 or provided to the pre-processor 13 e.g. by a user or from some other source. In an embodiment, the cost of a data object may be a function of whether or not a network transaction is required to fetch the data object.

In still further example, establishing the order may include identifying one or more atoms comprised within the one or more rules of the current epoch $E_i$ that have not yet reached a conclusion, determining the data objects referenced by the identified atoms, and determining, for each atom for which data object has not yet been acquired, a data source for acquiring the one or more data objects referenced by the atom. In an embodiment, a data source for each atom may be determined by determining an XPath of YANG object that maps to the atom. In such an embodiment, such a determination may include determining the XPath of YANG object based on one or more YANG models of one or more network elements referenced by the plurality of rules, base ontology of a knowledge base comprising the plurality of rules, and a set of predefined mapping rules.

While examples described above all indicate establishing an order for acquiring data objects that depends, in one way or another, on a cost associated with acquiring such object, embodiments described herein are in no way limited to only such considerations and are applicable to any considerations which may be important or relevant in a particular deployment of a semantic reasoner. For example, in other embodiments, the reasoning engine pre-processor 13 may be configured to establish the grouping order based on the time it takes to acquire each data object, e.g. with the data objects that are the quickest to acquire being placed in the first group. In another example, data objects that take the most time to acquire could be placed in the first group, so that the acquisition process for those objects begins first, with the idea that by the time the data objects of the last group are acquired (the ones that take the least time to acquire), the objects that take longer will be available so that the reasoning engine can perform machine reasoning on the rules of the current epoch.

The method then proceeds to step 214 (step c) where the reasoning engine pre-processor 13 acquires the one or more data objects assigned to a group that is first in the ordered set of groups of step 212.

In an embodiment, the first data acquisition cycle may target all devices for which corresponding Individuals of the "Device" Class had been created in the KB. Subsequent cycles may target a subset of those devices as described below. In an embodiment, there could also be another data acquisition cycle, prior to the first cycle, where some data is fetched unconditionally (in a bootstrapping phase, for the first round of reasoning).

In step 216 (step d), the reasoning engine pre-processor 13 instructs/controls the reasoning engine 18 to perform machine reasoning over the data objects acquired in step 214, or over all of the data objects that have been acquired so far in the current epoch (which includes the data objects acquired in step 214). As a result of the machine reasoning of step 214, zero or more rules of the current epoch may reach a conclusion. Other rules of the current epoch may not yet reach a conclusion because e.g. data object necessary to reach such a conclusion has not yet been acquired.

In an embodiment, using the reasoning engine in step 216 may include performing machine reasoning according to pre-configured rules and policies. For example, machine reasoning may be performed according a Rete algorithm.

Alternatively or additionally to the embodiment described above, using the reasoning engine in step 216 may include generating a semantic model of the system from the data objects acquired in step 214 according to a base ontology of the system, automatically mapping the semantic model to a knowledge base, feeding contents of the knowledge base to the reasoning engine, and using the reasoning engine to perform machine reasoning over the contents fed to the reasoning engine. In an embodiment, the base ontology may include scope of the system, devices (e.g. network elements) in the system, and individual protocols and features that run on the devices, where the base ontology specifies concepts, relationship between concepts, data properties and individuals.

In an embodiment, the semantic model may be generated by parsing the one or more data objects acquired in step 214, loading the parsed one or more data objects into in-memory data structures, accessing a manifest specifying binding between a data definition format and ontology components of the base ontology, identifying ontology components associated with the one or more data objects acquired in step 214 based on the manifest, and populating the identified ontology components with individuals and properties from the corresponding in-memory data structures. Some examples of data definition formats include SMI, YANG, and XML. When such data definition formats are used, the manifest may include mapping of at least one of SMI managed object, YANG leaf and XML element to OWL class to which an individual belongs, mapping of at least one of SMI object hierarchy, YANG leafref and XML element hierarchy to an OWL object property asserted over a pair of individuals, mapping of a value of at least one of SMI object, YANG leaf and XML element to an OWL individual of a corresponding class, and asserting a data property on an individual.

After the machine reasoning of step 216, the reasoning engine pre-processor 13 checks, in step 218 (step e) whether there are any rules left in the current epoch that have not reached a conclusion yet. In step 220, the reasoning engine pre-processor 13 determines how many rules of the current epoch that have not yet reached a conclusion have been identified. If one or more such "unconcluded" rules have been identified, the steps 210-220 are repeated, as shown with an arrow from step 220 to step 210. In this manner, data objects for a particular current epoch are acquired, in order, until all rules of the current epoch have reached a conclusion.

If, in step 220, the reasoning engine pre-processor 13 determines that all rules of the current epoch $E_i$ have reached a conclusion, then the reasoning engine pre-processor 13 checks, in step 222, whether the index "i" is equal to N. If not, then the method proceeds to step 224 where the value of the index is incremented by 1 and steps 210-220 are performed for the next epoch of the sequence in the manner described above. If, in step 222, the reasoning engine pre-processor 13 determines that the index "i" is already equal to N, then the method ends because all rules of all epochs have reached a conclusion.

One particular example of carrying out the method described above is now described.

Figure 4:
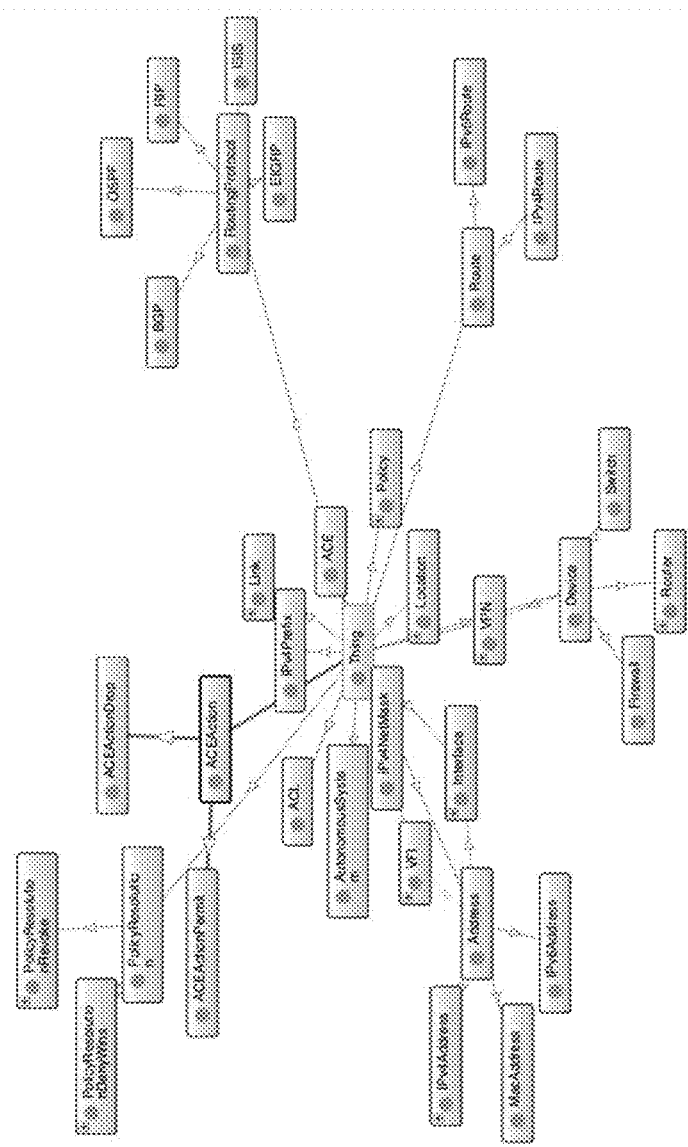
FIG. 4 is a simplified block diagram illustrating classes and properties, according to some embodiments of the present disclosure.

One the rules have been classified into epochs, the reasoning engine pre-processor 13 may first examine the rules in the first epoch to identify the associated Class and Property atoms. Examples of such atoms are illustrated in FIG. 4. For each such atom, the reasoning engine pre-processor 13 may determine the XPath of the YANG artifact that maps to the atom. As an example, a Class atom would map to a YANG container, an Object Property Atom may map to a YANG leaf-ref, and a Datatype Property atom may map to a YANG leaf. In order to determine this mapping, the reasoning engine pre-processor 13 may take as input the YANG models of the network elements, the base Ontology of the KB and a set of predefined mapping rules.

The reasoning engine pre-processor 13 may then request the YANG artifacts for the first epoch from the network elements. In various examples known in the art, this can be accomplished with the help of a Controller that supports a model driven service abstraction layer, such as OpenDaylight or alternatively through using Peer Mount technology, or natively over a network management protocol such as e.g. Netconf.

Once the data has been fetched from the network, the reasoner 12 can run through the asserted facts and calculate any inferences associated with the rules of the first epoch. Processing in the reasoning engine pre-processor 13 may now proceeds to determining the data set needed for the next epoch, together with the target devices from which to fetch the data.

For all epochs $E_i$, where i>1, the reasoning engine pre-processor 13 may identify the subset of rules in the current epoch that are candidate to fire because their dependencies within the previous epoch(s) have been satisfied (i.e. fired). The reasoning engine pre-processor 13 would then determine the remaining atoms of the rules in said subset and would map those to the corresponding YANG XPath of the objects to be fetched from the network elements. The reasoning engine pre-processor 13 may then request the data to be fetched based e.g. on a "least cost first" approach where data elements that are "inexpensive" to acquire are fetched first. Then based on the outcome of the evaluation (e.g. pattern matching or value checks) of these inexpensive data elements, the reasoning engine pre-processor 13 may determine whether or not it is necessary to fetch the more expensive data.

As an example, in one embodiment where the semantic reasoner 12 would use the Rete algorithm for rule evaluation, the reasoning engine pre-processor 13 may examine the state of the Rete network after all asserted and inferred facts have been propagated as a consequence of the first data acquisition cycle. The reasoning engine pre-processor 13 may identify all Beta nodes for which one input had fired and backtrack the subset of the Alpha Network leading to these Beta nodes all the way to the Alpha nodes. For every Alpha node, the reasoning engine pre-processor 13 may mark the associated Property atoms, in addition to the Class atoms associated with the nodes. The reasoning engine pre-processor 13 then maps the marked Class and Property atoms to the YANG XPath, and places the YANG artifacts on an "Agenda" of data elements to be fetched from the network.

Continuing with the Rete algorithm evaluation example, the reasoning engine pre-processor 13 may iterate over the YANG artifacts in the Agenda, and request the least expensive data elements to be fetched from the network. In an embodiment, in order to determine the target devices from which to fetch the data, the reasoning engine pre-processor 13 may look at device assertions that matched the Alpha node (within the upstream sub tree of said Beta nodes), which tests that an Individual belongs to the "Device" Class. With this information, the reasoning engine pre-processor 13 can request for the data to be fetched from the network. When the data elements are available to the system (i.e. have been acquired), the newly asserted facts are propagated through the Rete network. Any matches that fail in the Alpha network are marked in the Beta memory of the Beta nodes. The reasoning engine pre-processor 13 may identify all such Beta nodes for which one input has failed, and backtrack the subset of the Alpha Network leading to these Beta nodes all the way to the Alpha nodes. The reasoning engine pre-processor 13 may then eliminate from the Agenda any YANG data elements that correspond to atoms in those Alpha nodes. Effectively, doing so eliminates the need to fetch expensive data which is inconsequential to the outcome of the reasoning. This process is repeated until all epochs have been exhausted.

As a further optimization, in an embodiment, the reasoning engine pre-processor 13 may incorporate an understanding of the speed of obsolescence of data elements. In such an embodiment, the reasoning engine pre-processor 13 may process rules with dynamic data last to ensure the system has the best chance of being in the desired state when certain head conditions fire.

As another optimization, in an embodiment, the methods described above may be adjusted by dynamically assigning rules to epochs. In such an embodiment, the reasoning engine pre-processor 13 would still begin with constructing the dependency chain. It would then assign those rules that do not depend on any other rules to the first epoch and proceed to acquire data objects and use the reasoning engine to carry out machine reasoning for that epoch, as described above. Once all of the rules of the first epoch have reached a conclusion, the reasoning engine pre-processor 13 would then revise the dependency chain to determine which rules at that point (i.e. after the round of machine reasoning on the first epoch is completed) depend on at least one of the rules of the first epoch, assign those rules to the second epoch. The reasoning engine pre-processor 13 would then proceed to acquire data objects and use the reasoning engine to carry out machine reasoning for the second epoch. The process continues until all epochs are evaluated. Such dynamic assignment of rules to epochs may be advantageous in being very responsive to changes, e.g. changes in rules dependencies as a result of evaluation of the preceding epochs.

In summary, methods described above establish the sequencing of rule processing epochs by determining the set of independent conclusions which might be reached for a set of unprocessed rules. In addition, based e.g. on the expensiveness of data acquisition for alpha nodes, fetch cycle sequencing within an epoch can also be automatically generated in a way which minimizes costs. In an example, a data object is only fetched when it is the least cost barrier to completing a reasoning task.

Methods described herein may allow minimizing the object acquisition costs during the evaluation of the entire KB and ensure that no network or device resources are wasted in fetching data that is inconsequential for reasoning. In addition, they may reduce or eliminate the need for human effort to construct the rules that define the commands in the KB. Limiting the rules in the KB to normative rules may improve reasoning performance. Further, the methods may facilitate treating the rules in the KB as independent of target devices. As such, methods described herein may help network operators to manage, diagnose and/or predict failures in their network.

Improvements Associated with Large Sets of Data

In one embodiment, the reasoning engine pre-processor 13 is configured to carry out the minimized processing method enabling the semantic reasoner 12 to reduce processing necessary for a new set of data by only re-processing rules affected by data that has changed with respect to the previous round of semantic reasoning. The minimized processing method is particularly suitable for being carried out on of an underlying Rete algorithm because the method for evaluating rules against a data set in a manner prescribed by the Rete algorithm provides an optimized foundation on which further optimizations, such as e.g. described in the present disclosure, can be build. Embodiments of the present disclosure are not, however, limited to the use of Rete algorithm and other algorithms may be used as well.

Figure 5A:
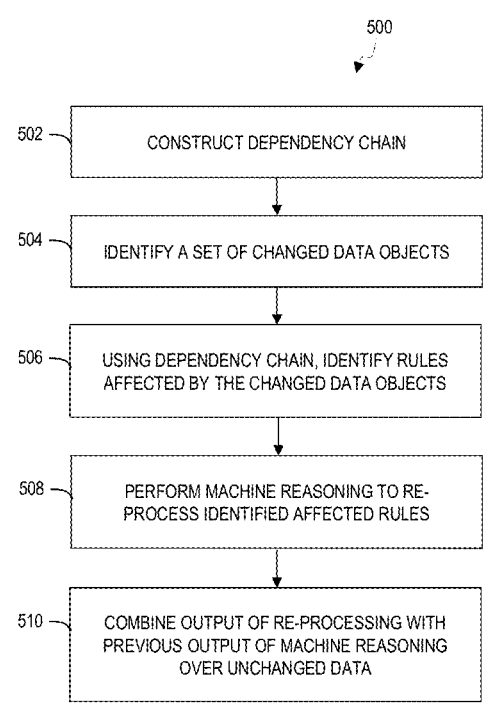
FIGS. 5A-5B are simplified flow diagrams illustrating example operations of a minimized processing method, according to some embodiments of the present disclosure.
Figure 5B:
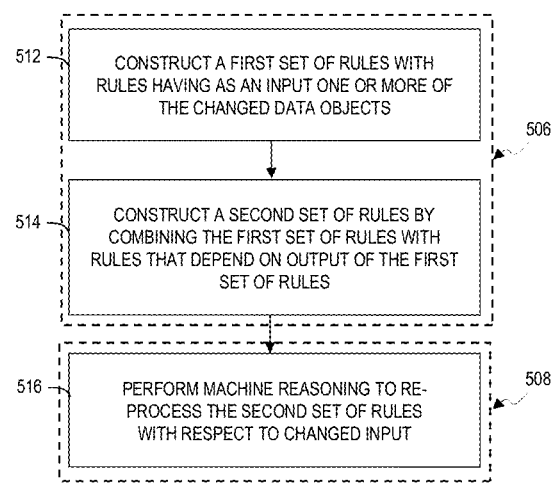

FIGS. 5A-5B are simplified flow diagrams illustrating example operations that may be associated with embodiments of the communication system 10. The operations shown in FIGS. 5A-5B outline a computer-implemented minimized processing method 500 carried out by the reasoning engine pre-processor 13. While method steps of the method 500 are explained with reference to the elements of the communication system 10 of FIG. 1, a person skilled in the art will recognize that any system or network element configured to perform these method steps, in any order, is within the scope of the present disclosure.

As shown in FIG. 5A, the method 500 may begin in step 502, where the reasoning engine pre-processor 13 constructs a dependency chain for the plurality of rules in the KB 16. The dependency chain identifies whether and how each rule depends on other rules in the KB 16. Discussions provided above with respect to constructing a dependency chain in context of step 202 shown in FIG. 2A are applicable here and, therefore, in the interests of brevity, are not repeated. Illustration of FIG. 3 described above is also applicable here as far as it shows an example of how rules may depend on one another. One difference with the description provided for step 202 and for the illustration of FIG. 3 above is that, for the minimized processing method 500, constructing a dependency chain enables later determination of which rules may be affected by changes associated with a new set of data objects. Division of rules into epochs based on the dependency chain and epoch-based rule processing, as is done in the sequential data acquisition method described above, may but does not have to be performed in the minimized processing method 500.

The method 500 may then proceed to step 504, where the reasoning engine pre-processor 13 identifies a set of changed data objects. This step is performed in the following context. At some earlier point in time, machine reasoning over a first set of data objects (i.e., over what was, at that time, the current state of inputs represented within the KB) over at least some rules of the rules in the KB 16 was performed. At some later point in time, current state of inputs represented within the KB has changed and is now referred to as a "second set of data objects", representing the current state of inputs at a current time. For example, Individuals may be created or destroyed, may be added or removed from Classes, and properties of Individuals may change. In step 504, the reasoning engine pre-processor 13 compared the second set of data objects with the first set of data objects to identify changes in the second set with respect to the first set. Those data objects that have been identified as changed in step 504 are referred to as a "set of changed data objects."

In step 506, the reasoning engine pre-processor 13 uses the dependency chain constructed in step 502 to identifying rules that may be affected by at least one data object of the set of changed objects. For example, with reference to a dependency chain shown in FIG. 3, if e.g. rule R8 is affected by the changes because a changed input is provided to this rule, then rules R6, R7. R12, and R14 may also be affected because they all depend, directly or indirectly, on the affected rule R8. It should be noted that step 506 identifies rules that may be affected but not necessarily all of those rules will in fact be affected. Just because a certain second rule (e.g. R6 or R14) depends, directly or indirectly, on a certain first rule (e.g. R8) and the first rule is affected by changes, it does not necessarily mean that the second rule will also be affected by changes because, as a result of carrying out semantic reasoning on the first rule or any intermediate rules between the first and second rules, it may turn out that the second rule is no longer affected by the changes. This will be described in greater detail below.

In step 508, the reasoning engine pre-processor 13 uses the reasoning engine 18 to perform machine reasoning by re-processing the rules identified in step 506. In an embodiment, the rules identified in step 510 are re-processed only with respect to an input that either includes one or more data objects of the set of changed data objects or depends, either directly or indirectly, on the output of at least one rule that has such an input.

In step 510, the reasoning engine pre-processor 13 generates an output of machine reasoning over the second set of data objects by combining the output of the re-processing in step 508 with at least a part of the output of the machine reasoning over the first set of data objects (i.e. with the part that is applicable to those data objects of the second set of data objects that have not changed with respect to the first set of data objects and, therefore, does not have to be re-processed in order to use it's results). By re-processing only the rules that may be affected by the changes, instead of the entire rule set, minimizes processing that needs to be performed to obtain results of semantic reasoning over the second set of data objects. Even if some of the identified rules do not, at the end, turn out to be affected by the changes, processing is still minimized compared to the entire rule set.

Further, optional, details of steps 506 and 508 are illustrated in FIG. 5B. As shown in FIG. 5B, in an embodiment, the reasoning engine pre-processor 13 may be configured to identify rules affected by the changed data objects by, first, identifying a first set of rules that includes those rules that have at least one changed data object as an input (step 512), and then, based on the dependency chain, analyzing the remaining rules to determine whether there are any rules that have an input that depends, either directly or indirectly, on an output of any of the rules of the first set of rules and adding such remaining rules to a second set of rules (step 514). In addition, the rules of the first set of rules are added to the second set. As a result, the second set of rules contains all of rules that potentially could be affected by the change and step 508 includes performing machine reasoning over this second set of rules (step 516), preferably only with respect to changed input.

Figure 6B:
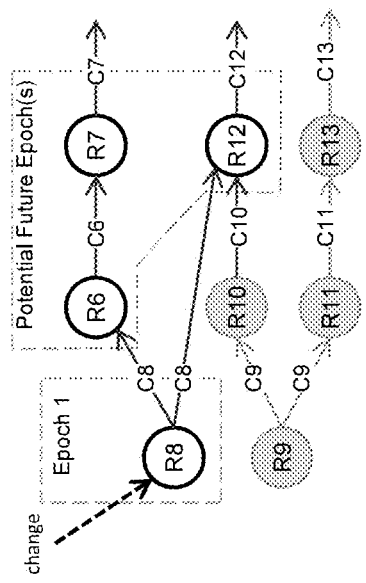
FIGS. 6A-6B is a simplified block diagram illustrating example dependencies between the rules and how a change to a rule affects that and other rules, according to some embodiments of the present disclosure.
Figure 6A:
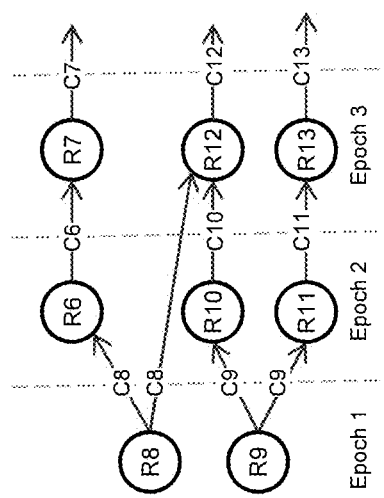

FIGS. 6A-6B is a simplified block diagram illustrating example dependencies between the rules and how a change to a rule affects that rule and other rules, according to some embodiments of the present disclosure. In FIG. 6A, a portion of a dependency chain is illustrated, which may, but do not have to be, classified into epochs. Conclusions of the rules are shown with letter "C" followed up by the number of the rule making the conclusion, e.g. a conclusion of rule R11 is shown as "C11," while two possible different conclusions of rule R8 are shown as "C8" in FIG. 6A. FIG. 6B illustrates the same portion of the dependency chain as well as indicates that there is a change to the input of rule R8. Just as rule R8, rule R9 also does not depend on any other rules. Unlike R8, there is no change to R9. Therefore, R9 is shaded, indicating that R9 is not affected by the changes. In the illustrated example, R8 forms the first set of rules (i.e. one or more rules that have as an input one or more of changed data objects).

As shown in FIG. 6B, rules that may be affected by the changes to R8 include, first of all, rules R6 and R12 which directly depend on rule R8 because the output C8 of R8 is the input to these rules. Therefore, rules R6 and R12 are added to the second set of rules. Furthermore, the output C6 of R6 is an input to R7, which means that R7 is also affected by the outcome of rule R8 and is also added to the second rule set. Since the second set further includes the rules of the first set, for the illustration of FIG. 6B, rules of the second set are rules R8, R6, R12, and R7. Those are the rules that are to be re-processed according to the minimized processing method presented herein. All of the other rules in FIG. 6B are shaded, to indicate that they are not affected by changes and, therefore, do not need to be re-processed.

It should be noted that some of the rules added to the second set may also have inputs that are not affected by changed data objects. For example, as shown in FIG. 6B, besides having an input C8 that is an output of rule R8, rule R12 also has an input C10 that is an output of rule R10, R10 being unaffected by changes. Therefore, in an embodiment, when rules of the second set are re-processed, they are only re-processed with respect to changed inputs, if it's possible to separate their processing in this manner. Thus, if it's possible to re-process rule R12 only with respect to input C8 but not with respect to input C10, then the reasoning engine pre-processor 13 may be configured to do so.

In an embodiment of the minimized processing method, rules may be classified into epochs, e.g. as illustrated in FIG. 6A, where the classification is done in the same manner as described above for the sequential data acquisition method (and illustrated e.g. in FIG. 3), which description, therefore, is not repeated here. Rules that need to be re-processed are then re-processed sequentially by epochs. FIG. 6B illustrates that R8 will be the only rule in the first epoch because it's the only rule, within the second set of rules, that does not depend on any other rules. As shown in FIG. 6B, rules R6, R7, and R12 belong to potential future epochs. The word "potential" indicates that, as a result of processing preceding epochs, one of more rules in subsequent epochs may be removed from the second set. For example, consider that, as a result of processing R8, the conclusion that is reached it C8 shown with an arrow to R6, but not C8 shown with an arrow to R12. This means that, once the first epoch is processed, rule R12 is no longer affected by the changes. Therefore, R12 does not need to be re-processed.

Rules of the second set that, as a consequence of performing machine reasoning in preceding epochs, no longer need to be re-processed may be removed from the second set, further minimizing re-processing that needs to be done to perform machine reasoning on the entire second set of data objects. In other words, rules that might initially have been expected to be re-processed might automatically be dismissed (removed) from a subsequent epoch if all input conditions are identical to the previous rules evaluation or if all changed input conditions were un-required for processing in the rule's Alpha/Beta nodes (i.e., no change in processed state could result from re-processing of these rules).

Various implementations of epoch-based re-processing of rules of the second set would become apparent based on the epoch-based processing described above in association with the sequential data acquisition method. Three such embodiments are now provided as examples.

In a first embodiment of an epoch-based re-processing, the minimized processing method may further include a step of, based on the dependency chain, assigning each rule of the second set of rules to one epoch $E_i$ of a sequence of N epochs $E_1$-$E_N$. The assignment is performed as described above but only with respect to the second set of rules, where each rule assigned to a first epoch $E_1$ of the sequence does not depend on any rules of the second set of rules and where each rule assigned to an epoch subsequent to the first epoch $E_1$ (i.e., any epoch besides the first epoch) depends on at least one rule of an epoch immediately preceding the epoch in the sequence of N epochs. In such an embodiment, using the reasoning engine to perform machine reasoning may include performing machine reasoning over the N epochs sequentially, also as described above but now limited to the rules of the second set. In addition, following performing machine reasoning over each epoch $E_i$ of the sequence, the method may further include determining whether, e.g. as a result of performing the machine reasoning over the epoch $E_i$, there are one or more rules assigned to one or more epochs subsequent to the epoch $E_i$ that no longer have an input that depends, either directly or indirectly, on an output of at least one rule of the first set of rules, and, upon positive determination, removing such rules from the N epochs. Since rules assigned to the N epochs are rules of the second set, removing any rules from the N epochs effectively removes the rules from the second set, thus reducing the set of rules that need to be re-processed.

With reference to the example of FIG. 6B described above, the first epoch-based re-processing embodiment means that, initially, R8 is assigned to epoch $E_1$, R6 and R12 are assigned to epoch $E_2$, and R7 is assigned to epoch $E_3$, but as a result of processing the first epoch, R12 is removed from the second set because it is no longer affected by the outcome of R8.

In a second embodiment of epoch-based re-processing, the minimized processing method may further include a step of using the dependency chain to assign rules of the second set of rules that do not depend on any other rules of the second set of rules to the first epoch $E_1$ of the sequence of N epochs. Further epochs are not assigned at that point in time. In such an embodiment, using the reasoning engine to perform machine reasoning may include steps of (a), (b), and (c), performed by the reasoning engine pre-processor 13. Step (a) includes performing machine reasoning over the first epoch. Step (b), performed after step (a), includes determining whether, as a result of performing the machine reasoning over the first epoch, there are one or more rules within the second set of rules that no longer have an input that depends on an output of at least one rule of the first set of rules. Step (b) also includes that, upon positive determination, such rules are removed from the second set of rules, thereby reducing the second rule set by eliminating rules which are no longer affected. Step (c), performed after step (b), includes assigning each rule of the second set of rules that depends on at least one rule of the first epoch to a second epoch of the sequence of N epochs.

With reference to the example of FIG. 6B described above, the second epoch-based re-processing embodiment means that, initially, R8 is assigned to epoch $E_1$. After semantic reasoning is performed on the rules of the first epoch (i.e. on R8), the reasoning engine pre-processor determines, in step (b), that rule R12 no longer has an input that depends on the output of R8 and removes R12 from the second rule set. The remaining rules of the second set are then assigned to the next epoch, $E_2$, by assigning those rules of the second rule set to epoch $E_2$ that depend on at least one rule of the first epoch, meaning that R6 is assigned to $E_2$. Rules are assigned to subsequent epochs in a similar manner, i.e., after all of the rules of the second set of each epoch are re-processed, the reasoning engine pre-processor determines which rules still remain in the second set and which ones may be removed, and then assigns rules to the next epoch, until all rules in the second set of rules are re-processed.

In both the first and the second embodiments of epoch-based re-processing, the number N of epochs is known ahead of time. The difference between these embodiment lies in that, according to the first embodiment, rules are assigned to all epochs ahead of time (at the initial time of assigning rules to the first epoch $E_1$), while, according to the second embodiment, rules are assigned to an epoch every time a new epoch is to be entered. Such "just-in-time" epoch definition of the second embodiment may be more efficient, compared to the first embodiment, in that in processing e.g. epoch $E_1$, no output objects might change, meaning that serial processing of the rules in $E_2$ and $E_3$ may no longer be necessary.

A third embodiment of epoch-based re-processing goes still a step further in that the number of epochs does not need to be known or predefined ahead of time. In such an embodiment, using the reasoning engine to perform machine reasoning includes steps (a), (b), (c), (d), and (e), performed by the reasoning engine pre-processor 13. Step (a) includes using the dependency chain to assigning each rule of the second set of rules that does not depend on any other rules of the second set of rules to a current epoch. Step (b) includes performing machine reasoning over the current epoch. Step (c), performed after step (b), includes determining whether, as a result of performing the machine reasoning over the current epoch, there are one or more rules within the second set of rules that no longer have an input that depends on the output of at least one rule of the first set of rules, and, upon positive determination, removing such rules from the second set of rules. Step (d), also performed after step (b) and performed at any time with respect to step (c) (i.e. before, after, simultaneously with, or overlapping in time), includes removing the rules of the current epoch that has been re-processed in step (b) from the second set of rules. Step (e), performed after both steps (c) and (d), includes determining whether there are any rules left to be processed, and, if so, then returning to step a) to begin processing of a new epoch.

With reference to the example of FIG. 6B described above, the third epoch-based re-processing embodiment means that, initially, rules R8, R6, R7, and R12 are in the second set of rules and rule R8 is assigned to the current epoch in the first iteration of steps (a)-(e). After semantic reasoning is performed, in step (b), on the rules of the current epoch (i.e. on R8), the reasoning engine pre-processor determines, in step (c), that rule R12 no longer has an input that depends on the output of R8 and removes R12 from the second rule set. In step (d), the reasoning engine pre-processor removes R8 from the second rule set as well, because that rule has already been re-processed. In step (e), the reasoning engine pre-processor determines that there are still rules remaining in the second set (namely, rules R6 and R7), so the method returns back to step (a) for the next iteration. In step (a) of this iteration, R6 is assigned to the current epoch because it does not depend on any other rules within the second set, in step (b) machine reasoning over R6 is performed, in step (c) not rules are removed because R7 still depends on the outcome of R6, in step (d) R6 is removed from the second set, in step (e) the reasoning engine pre-processor determines that there are still rules remaining in the second set (namely, R7), so the method returns back to step (a) for the next iteration. After R7 is processed in this next iteration, the method ends as all rules of the second set of rules have been re-processed.

Assignment of rules to epochs according to various epoch-based re-processing embodiments of the minimized processing method is also applicable to the sequential data acquisition method described above, where, the same teachings provided for the minimized processing method apply except that the "second set of rules" is replaced by all rules in the KB.

Various embodiments of the sequential data acquisition method described herein are applicable to the different epoch-based re-processing embodiments of the minimized processing method. For example, for the embodiment where rules are assigned to all epochs at the beginning (i.e., the first epoch-based re-processing embodiment), performing machine reasoning over each epoch $E_i$ may include steps of (a) identifying one or more data objects referenced by all rules of the one or more rules assigned to the epoch $E_i$ that have not reached a conclusion, (b) using one or more criteria to establish an order for acquiring one or more data objects of the data objects identified in step (a) that have not yet been acquired in the epoch $E_i$, where establishing the order includes assigning each data object of the one or more data objects of the data objects identified in step (a) that have not yet been acquired in the epoch $E_i$ to one group of an ordered set of one or more groups, (c) acquiring one or more data objects assigned to a group that is first in the ordered set of the one or more groups, (d) using a reasoning engine to perform machine reasoning over one or more data objects acquired in step (c), (e) following the machine reasoning of step (d), identifying which zero or more rules of the one or more rules assigned to the epoch $E_i$ have not reached a conclusion, and (f) iterating steps (a)-(e) until all rules of the one or more rules assigned to the epoch $E_i$ have reached a conclusion.

In another example, for the embodiment of "just-in-time" assignment of rules to N epochs (i.e., the second epoch-based re-processing embodiment), performing machine reasoning over each epoch $E_i$ may include steps (a)-(f) of the previous example and also a step (g) where, once all rules of the one or more rules assigned to the epoch $E_i$ have reached a conclusion and as long as there is at least one rule in the second set of rules that depends on at least one rule assigned to the epoch $E_i$, each rule of the second set of rules that depends on at least one rule assigned to the epoch $E_i$ is assigned to an epoch $E_{i+1}$ of the sequence of N epochs (i.e. to the epoch immediately following the epoch $E_i$ in the sequence).

In yet another example, for the embodiment where it is not known ahead of time how many epochs there will be (i.e., the third epoch-based re-processing embodiment), performing machine reasoning over each epoch $E_i$ may include steps of (a) based on the dependency chain, assigning each rule of the second set of rules that does not depend on any rules of the second set of rules to a current epoch, (b) identifying the set of data objects referenced by the rules assigned to the current epoch, (c) using one or more criteria to establish an order for acquiring one or more data objects of the data objects identified in step (b) that have not yet been acquired (or at least have not yet been acquired in the epoch $E_i$), where establishing the order comprises assigning each data object of the one or more data objects of the data objects identified in step (b) that have not yet been acquired to one group of an ordered set of one or more groups, (d) acquiring one or more data objects assigned to a group from the ordered set of the one or more groups, (e) using a reasoning engine to perform machine reasoning over one or more data objects, including those acquired in step (d), (f) following the machine reasoning of step (e), identifying which zero or more rules of the one or more rules assigned to the current epoch have not reached a conclusion, (g) removing objects which are no longer required by the set of rules from step (f) from the ordered set of one or more groups determined in (c), (h) iterating steps (d)-(g) until all rules of the one or more rules assigned to the current epoch have reached a conclusion, and (i) once all rules of the one or more rules assigned to the current epoch have reached a conclusion and as long as there is at least one rule in the second set of rules that depends on at least one rule assigned to the current epoch, remove the rules processed in the current epoch from the second set of rules, and go to step (a).

The minimized processing method described herein provides that streaming changes to a rules base are evaluated by the semantic reasoner 12 only as incremental changes to the existing state, enabling additional parallelism as well minimizing required processing. When streaming changes to the rules base are small, application of this method is likely to result in orders of magnitude savings of computational and memory resources associated with processing of the rules base. Other advantages include e.g. large increase in scalability of analytic engines by only processing deltas to an established in-memory state, faster reaction time to object add/change/delete, ability to run large "post-processing" consistency analysis fast enough so that real time consistency evaluation can be assessed between different levels of abstraction, allowing global abstractions to be tested against atomic (CLI level) configuration changes as they are applied, ability to have little applet applications that can be partitioned and distributed into the network to process deltas to current abstractions. Furthermore, abstractions between networking layers and systems may be intentionally established to compartmentalize processing, thus limiting the propagation of irrelevant changes to network elements that do not need to receive such changes. By eliminating extraneous and redundant rules processing via the minimized processing method, rules processing can cleanly match abstraction boundaries.

Variations and Implementations

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, semantic reasoner 12, in particular reasoning engine pre-processor 13. In some embodiments, one or more of these features may be implemented in hardware, provided external to these elements, or consolidated in any appropriate manner to achieve the intended functionality. The various network elements (e.g., semantic reasoner 12, in particular reasoning engine pre-processor 13) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, semantic reasoner 12, in particular reasoning engine pre-processor 13, described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 36) can store data used for the operations described herein. This includes the memory element being able to store instructions (e.g., software, logic, code, etc.) in non-transitory computer-readable storage media, such that the instructions are executed to carry out the activities described in this Specification. A processor can execute any type of instructions associated with the data to achieve the operations detailed herein in this Specification. In one example, processors (e.g., processor 38 or reasoning engine pre-processor 13) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing and sequence of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Although the claims are presented in single dependency format in the style used before the USPTO, it should be understood that any claim can depend on and be combined with any preceding claim of the same type unless that is clearly technically infeasible.

What is claimed is:

1. A method executed by a semantic reasoner in a system for controlling or managing a computer network, the method comprising:
   constructing a dependency chain for a plurality of rules associated with controlling or managing the computer network, the dependency chain identifying whether and how each rule of the plurality of rules depends on other rules of the plurality of rules;
   based on the dependency chain, assigning each rule of the plurality of rules to one epoch of a sequence of N epochs $E_1$-$E_N$, N being an integer equal to or greater than 2, wherein each rule assigned to an epoch subsequent to the first epoch $E_1$ depends on at least one rule assigned to an immediately preceding epoch; and
   performing machine reasoning over the N epochs sequentially such that each rule assigned to an epoch subsequent to the first epoch $E_1$ is processed after each rule assigned to an immediately preceding epoch is processed, wherein performing machine reasoning over each epoch $E_i$, i being an integer equal to or greater than 1 and equal to or smaller than N, comprises:
   (a) identifying one or more data objects obtained from one or more network elements within the computer network and referenced by one or more rules assigned to the epoch $E_i$ that have not reached a conclusion;
   (b) using one or more criteria to establish an order for acquiring one or more data objects of the one or more data objects identified in (a) that have not yet been acquired in the epoch $E_i$ by assigning the one or more data objects identified in (a) to one group of an ordered set of one or more groups; and
   (c) acquiring one or more data objects of the one or more data objects for which the order for acquiring was established in step (b) that are assigned to a group that is first in the ordered set of the one or more groups in the established order.

2. The method according to claim 1, wherein:
   each rule of one or more rules assigned to the first epoch $E_1$ does not depend on any rules of the plurality of rules.

3. The method according to claim 2, wherein performing machine reasoning over each epoch $E_i$ further comprises:
   (d) using a reasoning engine to perform machine reasoning over the one or more data objects acquired in step (c).

4. The method according to claim 3, wherein performing machine reasoning over each epoch $E_i$ further comprises:
   (e) following the machine reasoning of step (d), identifying which zero or more rules of the one or more rules assigned to the epoch $E_i$ have not reached a conclusion, and
   (f) iterating steps (a)-(e) until all rules of the one or more rules assigned to the epoch $E_i$ have reached a conclusion.

5. The method according to claim 1, wherein step (b) comprises identifying one or more atoms comprised within the one or more rules assigned to the epoch $E_i$, the one or more atoms referencing the one or more data objects for which the order for acquiring was established in step (b) and determining, for each atom of the one or more atoms, a data source for acquiring the one or more data objects referenced by the atom.

6. The method according to claim 5, wherein determining the data source for each atom comprises determining an XPath of a YANG object that maps to the atom.

7. The method according to claim 6, wherein determining the XPath of the YANG object that maps to the atom comprises determining the XPath of the YANG object based on one or more YANG models of the one or more network elements, a base ontology of a knowledge base comprising the plurality of rules, and a set of predefined mapping rules.

8. The method according to claim 1, wherein constructing the dependency chain comprises determining, for each rule of the plurality of rules, whether the rule depends on the other rules of the plurality of rules.

9. The method according to claim 8, wherein a first rule of the plurality of rules is determined to depend on a second rule of the plurality of rules when execution of the first rule depends on execution of the second rule.

10. The method according to claim 1, wherein the one or more criteria comprise one or more of a location of the one or more data objects for which the order for acquiring was established in step (b) in a memory, the one or more data objects for which the order for acquiring was established in step (b) having been acquired in one or more preceding epochs of the sequence, and an estimated cost of acquiring the one or more data objects for which the order for acquiring was established in step (b).

11. One or more computer readable storage media encoded with software comprising computer executable instructions for a semantic reasoner in a system for controlling or managing a computer network and, when the software is executed, operable to:
   construct a dependency chain for a plurality of rules associated with controlling or managing the computer network, the dependency chain identifying whether and how each rule of the plurality of rules depends on other rules of the plurality of rules;
   based on the dependency chain, assign each rule of the plurality of rules to one epoch of a sequence of N epochs $E_1$-$E_N$, N being an integer equal to or greater than 2, wherein each rule assigned to an epoch subsequent to the first epoch $E_1$ depends on at least one rule assigned to an immediately preceding epoch; and
   perform machine reasoning over the N epochs sequentially such that each rule assigned to an epoch subsequent to the first epoch $E_1$ is processed after each rule assigned to an immediately preceding epoch is processed, wherein performing machine reasoning over each epoch $E_i$, i being an integer equal to or greater than 1 and equal to or smaller than N, comprises:
     (a) identifying one or more data objects obtained from one or more network elements within the computer network and referenced by one or more rules assigned to the epoch $E_i$ that have not reached a conclusion;
     (b) using one or more criteria to establish an order for acquiring one or more data objects of the one or more data objects identified in (a) that have not yet been acquired in the epoch $E_i$ by assigning the one or more data objects to one group of an ordered set of one or more groups; and
     (c) acquiring one or more data objects of the one or more data objects for which the order for acquiring was established in step (b) that are assigned to a group that is first in the ordered set of the one or more groups in the established order.

12. The one or more computer readable storage media according to claim 11, wherein:
   each rule of one or more rules assigned to the first epoch $E_1$ does not depend on any rules of the plurality of rules.

13. The one or more computer readable storage media according to claim 12, wherein performing machine reasoning over each epoch $E_i$ further comprises:
   (d) using a reasoning engine to perform machine reasoning over the one or more data objects acquired in step (c).

14. The one or more computer readable storage media according to claim 13, wherein performing machine reasoning over each epoch $E_i$ further comprises:
   (e) following the machine reasoning of step (d), identifying which zero or more rules of the one or more rules assigned to the epoch $E_i$ have not reached a conclusion, and
   (f) iterating steps (a)-(e) until all rules of the one or more rules assigned to the epoch $E_i$ have reached a conclusion.

15. The one or more computer readable storage media according to claim 11, wherein step (b) comprises identifying one or more atoms comprised within the one or more rules assigned to the epoch $E_i$, the one or more atoms referencing the one or more data objects for which the order for acquiring was established in step (b) and determining, for each atom of the one or more atoms, a data source for acquiring the one or more data objects referenced by the atom.

16. A system for controlling or managing a computer network, the system comprising:
   at least one memory configured to store computer executable instructions, and
   at least one processor coupled to the at least one memory and configured, when executing the instructions, to:
     construct a dependency chain for a plurality of rules associated with controlling or managing the computer network, the dependency chain identifying whether and how each rule of the plurality of rules depends on other rules of the plurality of rules;
     based on the dependency chain, assign each rule of the plurality of rules to one epoch of a sequence of N epochs $E_1$-$E_N$, N being an integer equal to or greater than 2, wherein each rule assigned to an epoch subsequent to the first epoch $E_1$ depends on at least one rule assigned to an immediately preceding epoch; and
     perform machine reasoning over the N epochs sequentially such that each rule assigned to an epoch subsequent to the first epoch $E_1$ is processed after each rule assigned to an immediately preceding epoch is processed, wherein performing machine reasoning over each epoch $E_i$, i being an integer equal to or greater than 1 and equal to or smaller than N, comprises:
       (a) identifying one or more data objects obtained from one or more network elements within the computer network and referenced by one or more rules assigned to the epoch $E_i$ that have not reached a conclusion;
       (b) using one or more criteria to establish an order for acquiring one or more data objects of the one or more data objects identified in (a) that have not yet been acquired in the epoch $E_i$ by assigning the one or more data objects to one group of an ordered set of one or more groups; and
       (c) acquiring one or more data objects of the one or more data objects for which the order for acquiring was established in step (b) that are assigned to a group that is first in the ordered set of the one or more groups in the established order.

17. The system according to claim 16, wherein:
   each rule of one or more rules assigned to the first epoch $E_1$ does not depend on any rules of the plurality of rules.

18. The system according to claim 17, wherein performing machine reasoning over each epoch $E_i$ further comprises:
   (d) using a reasoning engine to perform machine reasoning over the one or more data objects acquired in step (c).

19. The system according to claim 18, wherein performing machine reasoning over each epoch $E_i$ further comprises:
   (e) following the machine reasoning of step (d), identifying which zero or more rules of the one or more rules assigned to the epoch $E_i$ have not reached a conclusion, and
   (f) iterating steps (a)-(e) until all rules of the one or more rules assigned to the epoch $E_i$ have reached a conclusion.

20. The system according to claim 16, wherein step (b) comprises identifying one or more atoms comprised within the one or more rules assigned to the epoch $E_i$, the one or more atoms referencing the one or more data objects for which the order for acquiring was established in step (b) and determining, for each atom of the one or more atoms, a data source for acquiring the one or more data objects referenced by the atom.

* * * * *